United States Patent
Sakurai et al.

(10) Patent No.: US 7,976,808 B2
(45) Date of Patent: Jul. 12, 2011

(54) METHOD FOR REMOVING HALOGEN SERIES GAS AND AGENT FOR REMOVING HALOGEN SERIES GAS

(75) Inventors: Shigeru Sakurai, Chiyoda-ku (JP); Hisakazu Arima, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 12/273,743

(22) Filed: Nov. 19, 2008

(65) Prior Publication Data
US 2009/0130012 A1     May 21, 2009

Related U.S. Application Data

(63) Continuation of application No. PCT/JP2007/058294, filed on Apr. 16, 2007.

(30) Foreign Application Priority Data

May 19, 2006   (JP) ................................. 2006-140213

(51) Int. Cl.
    *B01D 53/68*         (2006.01)
(52) U.S. Cl. ................. 423/241; 423/240 S; 423/245.1; 588/415; 502/183; 502/184; 502/416; 502/427
(58) Field of Classification Search ............... 423/240 S, 423/245.1, 241; 502/183, 184, 237, 416, 502/427; 95/131, 132
See application file for complete search history.

(56) References Cited

U.S. PATENT DOCUMENTS

| | | | |
|---|---|---|---|
| 4,380,501 A | 4/1983 | Wojtowicz et al. | |
| 4,668,489 A * | 5/1987 | Alexander et al. | ......... 423/240 R |
| 6,685,901 B2 | 2/2004 | Hirano et al. | |
| 7,306,775 B2 | 12/2007 | Hirano et al. | |
| 2001/0013590 A1 | 8/2001 | Izumikawa et al. | |
| 2002/0054846 A1 | 5/2002 | Fagiolini et al. | |
| 2004/0258596 A1* | 12/2004 | Hirano et al. | ............... 423/240 S |
| 2005/0106088 A1* | 5/2005 | Kato et al. | ................. 423/240 S |
| 2006/0079404 A1* | 4/2006 | Solovyov et al. | ............. 505/473 |
| 2007/0253879 A1 | 11/2007 | Sakurai et al. | |

FOREIGN PATENT DOCUMENTS

| | | |
|---|---|---|
| JP | 63137736 | 6/1988 |
| JP | 4-94723 | 3/1992 |
| JP | 2000254438 | 9/2000 |
| JP | 2001017831 | 1/2001 |
| JP | 2004081958 | 3/2004 |
| WO | WO 03/033115 | 4/2003 |

* cited by examiner

*Primary Examiner* — Ngoc-Yen M Nguyen
(74) *Attorney, Agent, or Firm* — Oblon, Spivak, McClelland, Maier & Neustadt, L.L.P.

(57) ABSTRACT

To provide an agent for removing a halogen series gas and a method for removing a halogen series gas which is excellent in a removing ability of removing the present halogen series gas in a low concentration area, which prevents an adsorbent from generating heat, and which is capable of reducing formation of a solid waste.

A method for removing a halogen series gas, which comprises bringing a gas to be treated which contains at least one member selected from the halogen series gas group consisting of $F_2$, $Cl_2$, $Br_2$, $I_2$, and compounds which generate a hydrogen halide or hypohalogeneous acid upon hydrolysis, into contact with a granule comprising, based on the total mass of the granule, from 45 to 99.85 mass % of an alkali metal salt, from 0.1 to 40 mass % of a carbonaceous material, and from more than 0 mass % to 15 mass % of an alkaline earth metal salt, in the presence of water.

6 Claims, 1 Drawing Sheet

US 7,976,808 B2

METHOD FOR REMOVING HALOGEN SERIES GAS AND AGENT FOR REMOVING HALOGEN SERIES GAS

TECHNICAL FIELD

The present invention relates to a method for removing a halogen series gas and an agent for removing a halogen series gas.

BACKGROUND ART

Usually, a dry etching exhaust gas containing a halogen series gas (hereinafter referred to sometimes as the present halogen series gas) of a group consisting of $F_2$, $Cl_2$, $Br_2$, $I_2$, and compounds which generate a hydrogen halide or hypohalogeneous acid upon hydrolysis, a CVD (Chemical Vapor Deposition) chamber exhaust gas containing a $SiH_4$ (silane) gas as the main component, and an ion implantation or doping exhaust gas containing $AsH_3$ (arsine) or $PH_3$ (phosphine) as the main component, contain the above-mentioned main component gases together with a carrier gas such as $N_2$ (nitrogen) gas, and a halogen series gas or particles formed by decomposition or reaction of such main component gases in a production apparatus.

Heretofore, as a method for treating the above-mentioned present halogen series gas, a dry type treating method using an adsorbent made of activated carbon as a packing material has been frequently used in order to make the apparatus smaller or to simplify the operation and maintenance of the apparatus. However, with such a treating method, there have been various problems such as, along with a danger of fire by heat of adsorption of a gas to be treated, degradation of working environment at the time of exchanging the packing material due to an odor of the present halogen series gas desorbed from a used adsorbent, and treatment of a solid waste, and it has been desired to solve such problems. Also, it has been desired to further increase the adsorption capacity of the packing material in order to reduce the frequency of exchanging operation of the packing material. These problems were particularly noticeable at the time of removing a $Cl_2$ gas or a gas mixture of $Cl_2$ and $BCl_3$ (boron trichloride), which has been frequently used.

In order to solve the above problems in the dry type treating method using an adsorbent made of activated carbon, a method for removing a halogen series gas by using a granule obtained by granulating a powder of a hydrogencarbonate, is suggested (e.g. Patent Document 1).

However, with the removing method described in Patent Document 1 wherein the present halogen series gas is removed only by a solid base, if the present halogen series gas is $F_2$, $Cl_2$, $Br_2$ or $I_2$, there is a concern that by formation of a hypohalogenite, a neutralization reaction will be hindered, and the treating capacity will decrease.

Further, a method for removing the present halogen series gas by using a removing agent made of a mixture of a solid base and activated carbon, is suggested (e.g. Patent Document 2). According to the removing method described in Patent Document 2, by using the removing agent made of the above mixture, it is possible not only to solve the above described problems such as a danger of fire by heat of adsorption of a gas to be treated, degradation of working environment due to an odor from the used adsorbent, and treatment of a solid waste, but also to increase the adsorption capacity of the packing material and to reduce the frequency of exchanging operation of the packing material.

However, with the removing method described in Patent Document 2, the sufficient removing ability can be shown in a case of removing the present halogen series gas having a high concentration, but the sufficient removing ability cannot be shown in a case of removing the present halogen series gas having a low concentration of e.g. approximately at most 5 vol %.

Further, as the removing agent for removing the present halogen series gas, one containing calcium hydroxide and thiosulfate is suggested (e.g. Patent Document 3).

However, like in the case of such a removing agent described in Patent Document 3, if the removing agent is constituted by the above calcium hydroxide as a main component, the heat generation value during the neutralization reaction will be large, and the reaction efficiency between the removing agent and a hydrogen halide will decrease, whereby there is a concern that a large amount of calcium hydroxide will remain as unreacted. Further, the solubility of the calcium hydroxide in water is extremely low, whereby when the used removing agent is treated, it is difficult to reduce the volume by dissolving the agent in water.

Patent Document 1: U.S. Pat. No. 6,685,901
Patent Document 2: WO03/033115
Patent Document 3: JP-A-2001-17831

DISCLOSURE OF THE INVENTION

Objects to be Accomplished by the Invention

The present invention has been made in view of the above problems, and it has objects to provide a method for removing a halogen series gas and an agent for removing a halogen series gas, which have an excellent removal treatment ability of the present halogen series gas, particularly, the present halogen series gas in a low concentration range, and which are capable of preventing the adsorbent from generating heat and of reducing the production amount of a solid waste.

Means to Accomplish the Objects

The present inventors have conducted extensive studies to accomplish the above objects, and as a result, they have found that it is possible to remove the present halogen series gas with high efficiency by bringing a gas to be treated which contains the above present halogen series gas, into contact in the presence of water, with a granule comprising a carbonaceous material and an alkaline metal salt as main components, and having an alkaline earth metal salt incorporated as a sub-component in a range of from more than 0 mass % to 10 mass %, based on the total mass of the granule.

Further, they have also found that the efficiency of removing the present halogen series gas will be remarkably improved when the content of the alkaline earth metal salt as a sub-component is as small as possible based on the total mass of the granule, and the present invention has been accomplished.

Namely, the present invention provides the following.

(1) A method for removing a halogen series gas, which comprises bringing a gas to be treated which contains at least one member selected from the halogen series gas group consisting of $F_2$, $Cl_2$, $Br_2$, $I_2$, and compounds which generate a hydrogen halide or hypohalogeneous acid upon hydrolysis, into contact with a granule comprising, based on the total mass of the granule, from 45 to 99.85 mass % of an alkali metal salt, from 0.1 to 40 mass % of a carbonaceous material, and from more than 0 mass % to 15 mass % of an alkaline earth metal salt, in the presence of water.

(2) The method for removing a halogen series gas according to the above (1), wherein the above alkali metal salt is at least one member selected from the group consisting of an alkali metal hydrogencarbonate and an alkali metal carbonate.

(3) The method for removing a halogen series gas according to the above (1) or (2), wherein the above alkali metal salt is sodium hydrogencarbonate and/or potassium hydrogencarbonate.

(4) The method for removing a halogen series gas according to any one of the above (1) to (3), wherein the above alkaline earth metal salt is a hydroxide of calcium or magnesium.

(5) The method for removing a halogen series gas according to any one of the above (1) to (4), wherein the above granule contains at least 90 mass % of particles having a particle diameter of at most 4 mm and at most 10 mass % of particles having a particle diameter of at most 1.0 mm.

(6) The method for removing a halogen series gas according to any one of the above (1) to (5), wherein the above granule comprises granule particles of a particle diameter of from 1.4 mm to less than 2.0 mm having an average hardness of at least 5 N, or granule particles of a particle diameter of from 2.0 mm to less than 2.8 mm having an average hardness of at least 15 N, or granule particles of a particle diameter of at least 2.8 mm having an average hardness of at least 25 N.

(7) The method for removing a halogen series gas according to any one of the above (1) to (6), wherein the above granule has a packed density of at least 0.7 g/cm$^3$.

(8) A method for producing a semiconductor, which comprises removing a halogen series gas by the method for removing a halogen series gas as defined in any one of the above (1) to (7).

(9) An agent for removing a halogen series gas which is made of a granule comprising, based on the total mass of the granule, from 45 to 99.85 mass % of an alkali metal salt, from 0.1 to 40 mass % of a carbonaceous material, and from more than 0 mass % to 15 mass % of an alkaline earth metal salt.

EFFECTS OF THE INVENTION

The granule of the present invention has a high ability of treating the present halogen series gas, particularly, the present halogen series gas in a low concentration range; prevents an adsorbent from generating heat; and is capable of reducing formation of solid wastes.

The method for removing a halogen series gas of the present invention improves the ability of a semiconductor production facility which needs to maintain a high operation rate of the facility and to use various gases, whereby it is possible to contribute to improvement in the production of semiconductors.

BEST MODE FOR CARRYING OUT THE INVENTION

Figure 1:
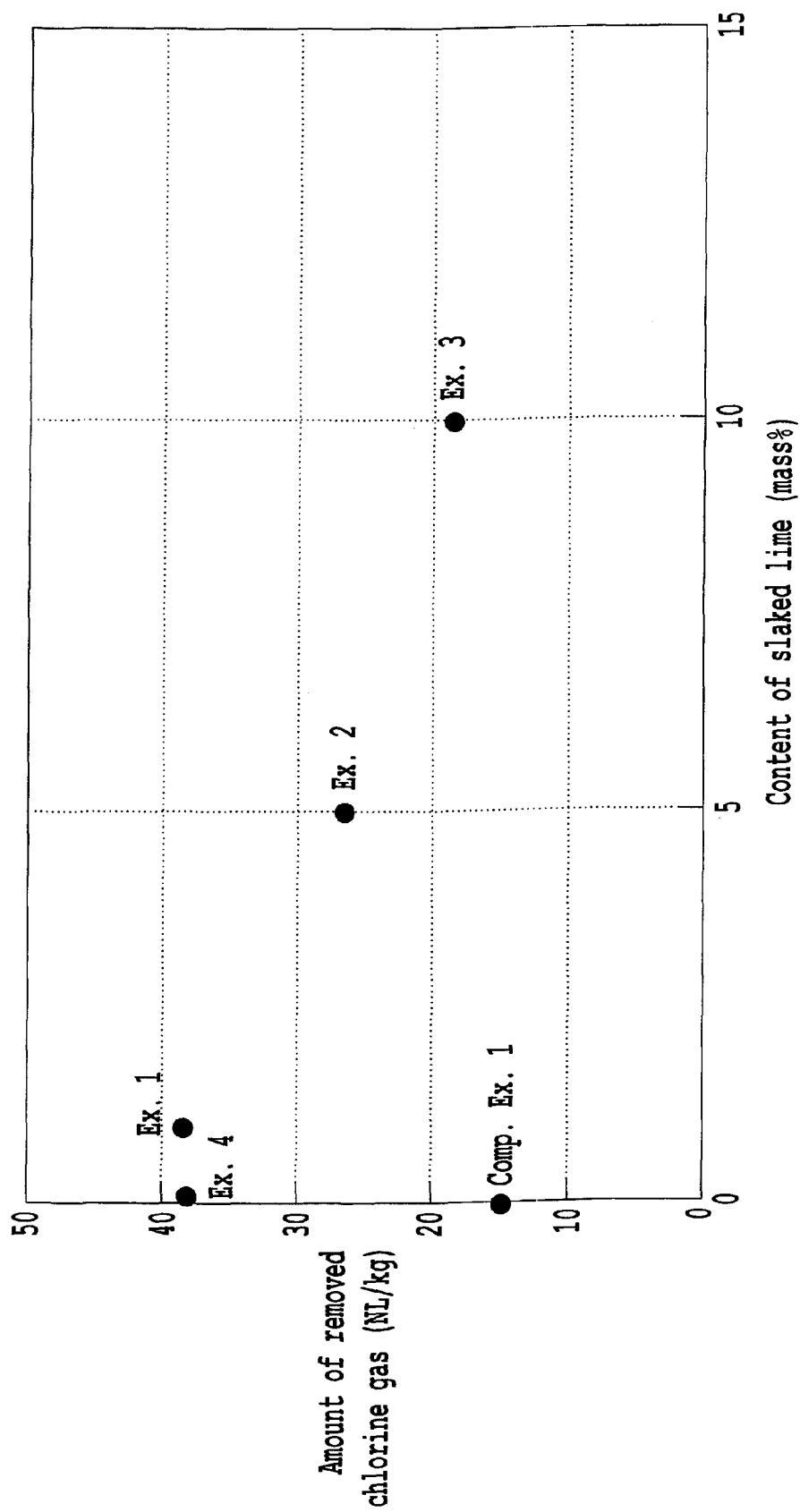
FIG. 1 illustrates a graph showing a relation between the content of calcium hydroxide in the present granule and the amount of chlorine gas removed, in Examples of the method for removing a halogen series gas and the agent for removing a halogen series gas, of the present invention.

Now, the method for removing a halogen series gas and the agent for removing a halogen series gas, of the present invention will be described in further detail.

A gas to be treated which is the target for treatment by the granule (the removing agent) of the present invention, is a gas containing at least one member selected from the halogen series gas (hereinafter, referred to sometimes as the present halogen series gas) group consisting of $F_2$, $Cl_2$, $Br_2$, $I_2$ and compounds which generate a halogen halide or hypohalogeneous acid upon hydrolysis. The gas containing the present halogen series gas may, for example, be a dry etching exhaust gas generated in e.g. a production step of semiconductors, a CVD chamber exhaust gas, an ion implantation exhaust gas or a doping exhaust gas.

The above mentioned compounds which generate a hydrogen halide or hypohalogeneous acid upon hydrolysis may, for example, be $SiF_4$ (silicon tetrafluoride), $SiH_2Cl_2$ (dichlorosilane), $SiCl_4$ (silicon tetrachloride), $AsCl_3$ (arsenic trichloride), $PCl_3$ (phosphorus trichloride), $BF_3$ (boron trifluoride), $BCl_3$ (boron trichloride), $BBr_3$ (boron tribromide), $WF_6$ (tungsten hexafluoride), $ClF_3$ (chlorine trifluoride) and $COF_2$ (carbonyl fluoride). Other than those, $COCl_2$ (phosgene), etc. which undergo hydrolysis by water, may also be treated by the removing treatment although the efficiency will slightly be lower as compared with the case of removing the above exemplified gases.

The compounds which generate a hydrogen halide or hypohalogeneous acid upon hydrolysis, are hydrolyzed by water to generate a hydrogen halide such as HF, HCl, HBr or HI, or a hypohalogeneous acid such as HClO, HBrO, HIO, and such water may be water contained in the gas to be treated, a trace of water attached to the granule, water to be formed by dissociation in the case where an alkali metal salt and/or an alkaline earth metal salt is hydrate, or water as a reaction product of the present granule.

The method for removing a halogen series gas of the present invention is a method for removing the present halogen series gas by bringing the gas to be treated which contains the above halogen series gas, into contact with the granule (hereinafter referred to sometimes as the present granule) comprising, based on the total mass of the granule, from 45 to 99.85 mass %, preferably from 50 to 99.85 mass %, of an alkaline metal salt, from 0.1 to 40 mass % of a carbonaceous material, and from more than 0 mass % to 15 mass %, preferably from more than 0 mass % to 10 mass %, of alkaline earth metal salt, in the presence of water.

In the present invention, the temperature inside of a container packed with the present granule is preferably in a range of preferably from 0 to 50° C., more preferably from 10 to 40° C., whereby the temperature of the present halogen series gas will be adjusted to be in such a range, and it will be possible to remove the present halogen series gas more efficiently, such being preferred. If the temperature of the present halogen series gas is lower than 0° C., there is a concern that the reaction rate of the present granule with the present halogen series gas may be lowered. Further, when the temperature of the present halogen series gas is at most 50° C., it is not necessary that a facility such as a packed tower be made of an expensive heat resistant material or have a heat resistant structure, whereby it is possible to simplify the treating operation and facility.

The alkali metal salt of the present invention is preferably at least one member selected from group consisting of a hydrogencarbonate, carbonate, oxide and hydroxide, of an alkali metal. For example, the hydrogencarbonate may, for example, be sodium hydrogencarbonate or potassium hydrogencarbonate, and the carbonate may, for example, be sodium carbonate, sodium sesquicarbonate ($Na_2CO_3 \cdot NaHCO_3 \cdot 2H_2O$) or potassium carbonate. Further, the oxide may, for example, be sodium oxide or potassium oxide, and the hydroxide may, for example, be sodium hydroxide or potassium hydroxide. The alkali metal salt may, for example, be sodium silicate, soda lime, sodium tripolyphosphate or sodium citrate. Here, with respect to sodium carbonate and sodium sesquicarbonate, it is possible to use a natural one or synthesized one, and sodium carbonate can be used regardless of light (light ash) or heavy (dense ash).

When the alkali metal salt is a carbonate or hydrogencarbonate, carbon dioxide gas is formed during a reaction with a hydrogen halide, and holes will be formed on the surface of the removing agent (granule), whereby the reaction efficiency will be improved, and it will be possible to increase the capacity of treating the present halogen type gas, such being desirable.

Further, in a case where the alkali metal salt is a hydrogencarbonate, such a hydrogencarbonate has fire-extinguishing property like sodium hydrogencarbonate which is commonly used as a fire-extinguisher. Further, since a neutralization reaction of a hydrogencarbonate is generally an endothermic reaction, the hydrogencarbonate does not generate heat, like slaked lime, whereby the reaction provides a remarkable merit as there is no risk of firing in comparison with adsorption operation with an activated carbon.

As the hydrogencarbonate, it is preferred to use sodium hydrogencarbonate or potassium hydrogencarbonate. Between them, sodium hydrogencarbonate is particularly preferred since it has no moisture-adsorbing property, and is suitable for preparing and storing a granule and readily available in a large amount at a low cost, thus being suitable as a raw material for industrial production.

The content of the alkali metal salt is in a range of from 45 to 99.85 mass %, preferably from 50 to 99.85 mass %, most preferably from 60 to 90 mass %, based on the total mass of the present granule.

The carbonaceous material in the present granule may, for example, be activated carbon, charcoal, bone black, graphite, carbon black, cokes, coal, fullerene, carbon nanotube, carbon microcoil or glass-form carbon, and it is particularly preferably activated carbon.

Further, in the present invention, the useful activated carbon is not limited by a difference in the raw material, the activation method or with or without impregnation or support.

The content of the carbonaceous material is in a range of from 0.1 to 40 mass % based on the total mass of the granule. If the carbonaceous material in the present granule is less than 0.1 mass %, the effect of containing the carbonaceous material which will be described later, will not be obtained, such being undesirable. Further, if the content exceeds 40 mass %, the strength of the present granule will decrease, and the particles will easily be broken, such being undesirable. Further, the content of the carbonaceous material in the present granule is preferably in the range of from 0.1 to 20 mass %.

The content of the alkaline earth metal salt in the present granule is from more than 0 mass % to 15 mass %. If the content of the alkaline earth metal salt in the present granule is more than 0 mass %, namely, if a trace of the alkaline earth metal salt is contained, it is possible to obtain the effect of containing the alkaline earth metal salt. Further, if the content is at most 15 mass %, the capacity of treating the present halogen series gas will be improved, such being desirable. Further, the lower limit of the alkaline earth metal salt is preferably at least 0.01 mass %, particularly preferably at least 0.05 mass %, most preferably at least 0.1 mass %. Further, the upper limit of the alkaline earth metal salt is preferably 10 mass %, particularly preferably 5 mass %, most preferably 3 mass %.

The mechanism of the effect such that by incorporating the alkaline earth metal salt, the removing efficiency of the present halogen series gas will be improved, is not clarified in detail, but it is considered attributable to an improvement of the usage efficiency of the total amount of the alkali metal salt and alkaline earth metal salt.

As the alkaline earth metal salt, it is possible to use a hydroxide of calcium or magnesium, and between them, calcium hydroxide (slaked lime) is preferred from a viewpoint such that it can be obtained in a large amount inexpensively. Further, as mentioned above, the preferred content of the slaked lime in the present granule is in an extremely low range, whereby the amount of heat to be generated during the neutralization reaction is sufficiently small, and there will be no practical problem.

In the present invention, when the present halogen series gas is $F_2$, $Cl_2$, $Br_2$ or $I_2$, it is possible to remove the present halogen series gas highly efficiently by incorporating the alkali metal salt, carbonaceous material and alkaline earth metal salt in the present granule, in the presence of a trace of water, as compared with a case where only the same amounts of alkali metal salt and carbonaceous material are used for the granule. Particularly, the present granule can provides a high removing effect when the present halogen series gas is in a low concentration range such as at most 20 vol %, further at most 5 vol %, furthermore at most 3 vol %.

The carbonaceous material in the present granule undergoes an oxidation-reduction reaction with $F_2$, $Cl_2$, $Br_2$ or $I_2$, in the presence of water, to form an acid. Namely, it is considered that the above reaction will be accelerated, as such an acid formed undergoes a neutralization reaction with the alkali metal salt. With respect to such a mechanism, an estimated reaction mechanism will be explained below with reference to a case where $Cl_2$ as a halogen is used as a gas to be treated, and as the present granule, one comprising sodium hydrogencarbonate as the alkali metal salt and slaked lime as the alkaline earth metal salt, is used.

By the reaction of sodium hydrogencarbonate ($NaHCO_3$) in the present granule with $Cl_2$, it is considered that sodium hypochlorite (NaClO) and sodium chloride (NaCl) are formed in accordance with the following formula (1). At this time, in order to make the reaction proceed from the left side to the right side in formula (1), it is necessary to reduce the amount of sodium hypochlorite on the right side as small as possible, and it is therefore necessary to successively decompose the sodium hypochlorite formed. Thus, the present inventors consider that the decomposition of sodium hypochlorite is a rate-determining factor for controlling the total reaction shown in formula (1).

On the other hand, the carbonaceous material forms hydrogen chloride (HCl) when reacted with $Cl_2$ in the presence of water, as shown in the following formula (2). The water needed for the reaction in formula (2), is supplied, for example, by water included in the gas to be treated, or a trace of water attached to the present granule. Further, as shown in the following formulae (1) and (3), after initiation of the reaction, water is supplied as a reaction product of the present granule. Further, as shown in the following formula (3), an acid such as hydrogen chloride to be formed in the following formula (2), is considered as one to accelerate the decomposition of sodium hypochlorite formed in the right side of the following formula (1).

$$2NaHCO_3 + Cl_2 \rightarrow NaClO + NaCl + H_2O + 2CO_2 \quad (1)$$

$$C + Cl_2 + H_2O \rightarrow CO + 2HCl \quad (2)$$

$$2NaClO + 2HCl \rightarrow 2NaCl + Cl_2 + H_2O + (1/2)O_2 \quad (3)$$

With respect to the acid formed in the formula (2), the excess acid which was not consumed in the formula (3), will be neutralized in the following formula (4).

$$HCl+NaHCO_3 \rightarrow NaCl+H_2O+CO_2 \qquad (4)$$

In the present invention, it is considered that sodium hypochlorite is smoothly decomposed by the reaction shown in the formula (3), and as a whole, $Cl_2$ is mainly removed by the following formula (5).

When a halogen is $F_2$, $Br_2$ or $I_2$, a hypohalogenite is formed in the same manner as above, and it is considered that its decomposition is accelerated by a hydrogen halide.

$$C+4NaHCO_3+2Cl_2 \rightarrow 4NaCl+2H_2O+4CO_2+CO+(1/2)O_2 \qquad (5)$$

The present granule preferably contains a porous material made of an inorganic material (hereinafter referred to simply as a porous material) in a range of from 1 to 20 mass %, more preferably in a range of from 5 to 15 mass %. By blending the porous material in the present granule, it is possible to lead the present halogen series gas and the halogen halide gas formed in the above formula to the inner portion of the present granule and to let them react with the entire present granule. If the content of the porous material is less than 1 mass %, there is a concern that its effect is not sufficiently achieved, and if the content exceeds 20 mass %, the proportion of effective components of the present granule will be small, and the reaction efficiency will decrease, such being undesirable.

Further, with respect to water formed by the reactions shown in the above formulae (1) to (4), when the excess water is adsorbed, the particles in the present granule will be mutually bonded to one another by dissolution. Therefore, when such a present granule is packed in a column, it will be difficult to take it out. In order to prevent or avoid such a problem, the porous material to be blended is preferably one having an ability to adsorb water.

The porous material preferably has an average pore radius in a range of from 0.1 to 50 nm, and it preferably has a pore volume in a range of from 0.005 to 0.5 $cm^3/g$.

The porous material introduces the present halogen series gas and the halogen halide gas formed in the above reaction formula, into a deep portion of the present granule, and it increases the specific surface area for the reaction of the present granule. In this manner, the reaction rate and the reaction efficiency of the present granule, the present halogen series gas and the halogen halide gas formed in the above formula, will be improved.

If the average pore radius and the pore volume of the porous material are smaller than the above ranges, gas diffusion becomes insufficient and the reaction rate and the reaction efficiency are lowered, such being undesirable. On the other hand, if the average pore radius and the pore volume are larger than the above ranges, the hardness of the present granule is lowered and the granule tends to be easily powdered, such being undesirable. Thus, it is particularly preferable that the porous material has an average pore radius in a range of from 0.2 to 50 nm, and a pore volume in a range of from 0.01 to 0.2 $cm^3/g$.

In the present specification, the average pore radius is a pore radius (nm) at the point when an accumulated pore volume becomes 50%, which is determined by measuring a pore volume by nitrogen gas adsorption method using a gas adsorption pore distribution analyzer and determining an accumulation curve when the total pore volume is made 100%.

Further, it is preferred to blend clay in the present granule since the clay has a layer structure which provides gaps within the present granule and introduce a gas to the inside of the present granule in the same manner as the porous material. If the content of the clay is less than 1 mass %, the improvement of the effect is not achieved, and if the content exceeds 20 mass %, there is a concern that the hardness of the present granule may be lowered. Further, when employing the porous material and clay in combination, their total amount is preferably at most 20 mass % based on the entire present granule.

The ratio of the alkali metal salt to the porous material or clay in the present granule is optimized depending on the composition, concentration, pressure, temperature, treating time and other conditions of a halogen series gas to be treated. For example, when the concentration, pressure and temperature of the present halogen series gas are low, and when the contact time between the present granule and the present halogen series gas is short, it is preferred to increase the content of the porous material.

Examples of the porous material include natural or synthetic zeolite, silica gel, alumina, porous glass, diatomaceous earth, calcium silicate, porous ceramics and the like.

Also, examples of the clay include activated clay, acid clay, pearlite, layer silicate i.e. chrysotile or bentonite; an acid-treated product such as sepiolite, palygorskite, allophane, imogolite or antigorite; and a synthetic layer compound. Silica gel and natural or synthetic zeolite are more preferred as the porous material, and activated clay and bentonite are more preferred as the clay since they are industrially easily available at a low cost.

In the present invention, it is preferable that primary particles of the alkali metal salt has an average particle diameter in a range of preferably from 1 to 500 µm, more preferably in a range of from 10 to 300 µm.

Further, as the carbonaceous material, it is preferred to use a pulverized one having an average particle diameter of the primary particles in a range of from 1 to 500 µm, more preferably in a range of from 5 to 300 µm, from a viewpoint such that in the step of mixing the raw material before forming a granule, the material can be mixed more uniformly. Further, the alkaline earth metal salt preferably has an average particle diameter of its primary particles in a range of from 1 to 500 µm, more preferably in a range of from 5 to 300 µm.

Further, when the porous material and clay are added to the present granule, similarly, they preferably have an average particle diameter of their primary particles of from 1 to 500 µm, more preferably from 5 to 300 µm.

If the above-mentioned average particle diameter of primary particles is less than 1 µm, satisfactory fluidity cannot be obtained and the handling becomes difficult, such being undesirable. On the other hand, if the average particle diameter of primary particles exceeds 500 µm, uniform mixing of the respective materials including the alkali metal salt in the granule becomes difficult, and industrial production of the granule becomes difficult, thereby requiring a high cost, such being undesirable.

The term "primary particles" used in the description of the present invention means each state of single crystal of the alkali metal salt, powder of the carbonaceous material, powder of the porous material and powder of the clay.

With respect to the average particle diameters of the powder and the granule in the present invention, for example, in a case where one has an average particle diameter of at least 70 µm, the "average particle diameter" means a particle diameter at the point of 50% of an accumulated mass determined by measuring a mass amount remaining on each sieve and the lowest bottom tray in accordance with sieve analysis and preparing an accumulation curve by taking the total mass amount as 100%.

On the other hand, in a case where one has an average particle diameter of less than 70 μm, the "average particle diameter" means a particle diameter at the point of 50% of an accumulated volume determined by measuring by an apparatus of measuring a laser diffraction scattering type particle diameter distribution and preparing an accumulation curve by taking the total volume as 100%.

It is preferable that the average particle diameter of the present granule is in a range of from 0.5 to 20 mm. By adjusting the average particle diameter of the present granule to be in such a range, without introducing new equipment, it is possible to use a packed type dry gas removing equipment which has been commonly used with activated carbon and zeolite as it is. If the average particle diameter of the present granule is less than 0.5 mm, it is not preferable since a pressure loss caused by passing the present halogen series gas to be treated through a packed bed of the present granule becomes high and consequently an additional aspirating equipment such as a vacuum pump must be employed or a required electric power of the equipment must be increased. On the other hand, if the average particle diameter exceeds 20 mm, it is not preferable since a contact surface area between the present halogen series gas and the external surface of the present granule is lowered and a performance of removing the present halogen series gas by the present granule is lowered. Thus, it is more preferable that the present granule has an average particle diameter of from 0.5 to 10 mm.

Also, when the method for removing a halogen series gas of the present invention is carried out by the halogen series gas-removing equipment in a semiconductor production process, and when a packed bed of the present granule is provided in such an equipment, it is preferred to use the present granule comprising preferably at least 90 mass %, more preferably at least 95 mass %, of granules having a particle diameter of at most 4 mm and preferably at most 10 mass %, more preferably at most 8 mass %, of granules having a particle diameter of at most 1.0 mm in order to improve the performance of removing the present halogen series gas, thereby providing a packed bed having a uniform structure and achieving a higher removing performance. This is because the number of theoretical plates is increased when the structure of the packed bed becomes uniform. When the amount of granules having a particle diameter of at most 4 mm is less than 90% by mass %, the packed structure of the packed bed not only does not become uniform but also the present halogen series gas hardly penetrates into the inside of large particles and consequently, the reaction rate of the present granule is lowered. On the other hand, when the amount of granules having a particle diameter of at most 1.0 mm is more than 10 mass %, the smaller granules enter into gaps of other granules, and the packed structure of the packed bed does not become uniform and consequently the reaction rate of the present granule is lowered since a uniform gas stream can hardly be formed.

By mixing a binder in the present granule, it is possible to further improve the hardness. The binder may be suitably selected, depending on the composition of the present halogen series gas as a gas to be treated, from known ones such as water glass (concentrated sodium silicate aqueous solution), sodium silicate, CMC (carboxymethyl cellulose), PVA (polyvinyl alcohol) and silicone oil.

The amount of the binder to be mixed is preferably in a range of from 0.01 to 10 mass %, more preferably in a range of from 0.01 to 5 mass %, based on the total mass of the present granule. If the amount of the binder to be mixed is less than 0.01 mass %, there is no effect of improving the hardness by the binder, whereby it is meaningless to use the binder, and if the amount to be added exceeds 10 mass %, the amount of the effective components in the reaction will decrease, such being undesirable.

For the evaluation of the strength of the present granule, a method for evaluation by the hardness is used.

The "hardness" in the present invention is a force required to compress and crush one particle by applying a vertical force thereto from the upper position. Since the hardness varies depending on a particle diameter even if the same material is employed, it is necessary to measure the hardness after adjusting particles, for example, by sieving. When the present granule has an average particle diameter in a range of from 0.5 to 20 mm, each particle is classified from 0.5 mm to gradually larger sizes 0.5 mm by 0.5 mm by sieving. For example, with regard to particles having an average particle diameter of from 1.5 mm to less than 2.0 mm, the particles are classified by using a sieve having an opening of 1.5 mm and a sieve having an opening of 2.0 mm to collect 20 pieces of particles remained on the sieve of 1.5 mm and passed through the sieve of 2.0 mm, and the hardness of each particle is measured and their average value is employed as an evaluation standard of a particle strength.

It is preferable that the present granule has an average hardness of at least 5 N, more preferably at least 10 N in the case of a granule having a particle diameter of from 1.4 mm to less than 2.0 mm, an average hardness of at least 15 N, more preferably at least 20 N in the case of a granule having a particle diameter of from 2.0 mm to less than 2.8 mm, or an average hardness of at least 25 N, more preferably at least 30 N in the case of a granule having a particle diameter of at least 2.8 mm.

If the hardness of the particles of the present granule is low, when the present granule is used as a packed bed, there is a problem such that the present granule may be powderized during packing or a reaction and is deposited in a pipe, or it cloggs grating or is sucked by a vacuum pump, or the pressure loss is increased when a gas to be treated passes through the packed bed, thus presenting a trouble in the operation of removing the present halogen series gas. Further preferred is a case wherein with respect to all of the above ranges of the particle diameter, the average hardness has a value of at least each of the above average hardness.

When the present granule is used as being packed in a column, etc., the packing density is preferably at least 0.7 g/cm$^3$. The present granule provides a merit of enhancing a treating capacity with an agent to be packed by one packing operation, since the present granule has a high bulk density and can be packed into a column of a removing apparatus at a high packing mass amount. While activated carbon which has been commonly used has a packing density of from 0.4 to 0.6 g/cm$^3$, the present granule can be adjusted to have a packing density of at least 0.7 g/cm$^3$, preferably at least 0.8 g/cm$^3$, most preferably at least 0.9 g/cm$^3$. Therefore, the present granule has a higher packing density per unit volume, and it is excellent from a viewpoint such that the amount of the present halogen series gas to be treated can be increased.

Further, in the present granule, the total amount of the above alkali metal salt, carbonaceous material and alkaline earth metal salt is preferably at least 80 mass %, more preferably at least 85 mass %, based on the total mass of the present granule. If the total amount of the alkali metal salt, carbonaceous material and alkaline earth metal salt is less than 80 mass %, the gas-treating capacity as an agent to remove the present halogen series gas will decrease, and the removing agent-packed bed will necessarily be exchanged more frequently, such being undesirable.

The present granule can be obtained by either a dry method or a wet method.

Examples of a granulating method include a compression-molding method, a rolling granulating method, an agitating granulating method, an extrusion molding method, a spray drying method, a fluidized bed method, and the like. Among them, a dry type compression-molding method such as a tableting method or a roll press method is preferable since it is favorable for industrial production because it requires no drying step and can simplify the process, it can produce a present granule having a high hardness without a binder, it can increase the total amount of an alkali metal salt, carbonaceous material and alkaline earth metal salt, and there is no fear such that the strength of the present granule decreases due to degradation of the binder by the present halogen series gas. In this case, as a method of adjusting a particle diameter distribution and an average particle diameter, of the present granule, a process of granulation by a dry compression-molding machine, roughly pulverizing and sieving can be employed.

Also, other methods for obtaining the present granule include a method comprising kneading the alkali metal salt, carbonaceous material and alkaline earth metal salt, if necessary, a porous material, binder, and water, followed by forming by a wet extrusion type molding machine such as a pelletizer, and then by drying and sieving to adjust a particle diameter distribution and an average particle diameter. Also, after molding by a pelletizer, pellets may be rounded into spheres by a rolling granulating machine such as a rounder, thereby preventing occurrence of an abraded part of the present granule (such as a protruded part easily falling off from the present granule) and increasing the density when they are packed into a packed bed.

Adjustment of the particle diameter distribution and the average particle diameter can be achieved also by repeating sieving operations for several times, and it is preferable to carry out a plurality of sieving operations since they can narrow the particle diameter distribution of the present granule and can produce a uniformly packed structure of a packed bed. Therefore, it is possible to improve the number of theoretical plates of the packed bed and further improve the capacity for treating the present halogen series gas.

As described above, according to the method for removing a halogen series gas of the present invention, it is possible to efficiently adsorb the present halogen series gas, particularly, the present halogen series gas in a low concentration range, by using the present granule (removing agent) wherein to a granule having a carbonaceous material and alkali metal salt as main components, an alkaline earth metal salt as a sub-component is incorporated in a range of from more than 0 mass % to 15 mass %, based on the total mass of the granule, and by bringing a gas to be treated which includes the present halogen series gas, into a contact with the present granule in the presence of water. Further, it is possible to prevent the present granule from generating heat during a neutralization reaction. Consequently, it is possible to remove the present halogen series gas with high efficiency, and it is possible to reduce formation of a solid waste.

With respect to the present granule of the present invention, when the alkali metal salt to be contained is sodium hydrogencarbonate or potassium hydrogencarbonate, it is water-soluble, and most of reaction products with the present halogen series gas are also water-soluble salts. Therefore, the present granule has an effect such that after removing the present halogen series gas, most of components other than a porous material dissolve in water, and it is possible to significantly reduce the amount of the solid waste. Further, when the present granule is dissolved in water, the porous material, etc. can be recovered by filtration and can be reused, if necessary, which is thereby helpful for recycling the sources.

Further, since the alkali metal salt in the present granule forms a non-volatile salt by a reaction with the present halogen series gas, a gas or halogen odor is not generated by desorption of the present halogen series gas from activated carbon at the time of exchanging the packing material as in the case of removing operation by adsorption with activated carbon alone. Thus, since the working environment at the time of exchanging the packing is remarkably improved, not only working safety of an operator is satisfactory but the removing equipment placed in a working place can be made smaller.

Further, in the method for removing a halogen series gas of the present invention, it is possible to use the present granule in combination with other removing agents. For example, depending on the composition of a gas to be treated, the present granule is mixed with a granule of activated carbon or sodium hydrogencarbonate, or a layer of the present granule is used in combination with a layer of a granule of activated carbon or sodium hydrogencarbonate. Such a mixture of granules or combination of layers is packed in a column of the removing apparatus. Especially, if hydrogen chloride is the main portion of the present halogen series gas, it is preferred to place a packed bed of a granule of sodium hydrogencarbonate in the upstream of a flow path of the present halogen series gas and place a packed bed of the present granule in the downstream.

The method for removing a halogen series gas of the present invention and the agent for removing a halogen series gas can suitably be used for a removing treatment of a halogen series gas in a step of producing a semiconductor. The method for removing a halogen series gas of the present invention improves an ability of a semiconductor production facility which needs to maintain a high operation rate of the facility and to use various gases, whereby it is possible to contribute to improvement in the production of semiconductors.

EXAMPLES

Now, the present invention will be described in further detail with reference to Examples and Comparative Examples, but it should be understood that the present invention is by no means restricted thereto.

Examples 1 to 10 and Comparative Examples 1 to 5 will be described below.

In the present Examples and Comparative Examples, the hardness was measured by using Kiya system digital hardness meter KHT-20 type (manufactured by Fujiwara Scientific Company Co., Ltd.). Also, since the hardness varies depending on the particle diameter, particles to be measured were adjusted so as to have same particle diameters by sieving.

With regard to an average particle diameter, an average particle diameter of less than 70 µm was measured by using Microtrack FRA9220 (manufactured by Nikkiso Co., Ltd.), and one having an average particle diameter of at least 70 µm was measured by sieving.

The measurement of the removing ability was carried out in such a manner that first, chlorine ($Cl_2$) was selected as a removing-object gas, and for detection of breakthrough from a column, a value of an alarm of a gas detector for semiconductor manufacturing gases XPS-7 (New Cosmos Electric Co., Ltd.) was set as 0.25 ppm. The reason for selecting chlorine gas as a removing-object was that when considering an experiment for an object of the present halogen series gas as a gas to be treated of the present invention, chlorine gas is commonly and widely used with respect to the comparison of abilities of agents.

Further, the effects of the present invention are not limited to the contents described in the following Examples of the present invention.

Example 1

A molded product which is a mixture of sodium hydrogencarbonate, activated carbon, slaked lime and zeolite, and which is a flake-like product having a slaked lime content of 1 mass %, was obtained by uniformly mixing 15.8 kg of sodium hydrogencarbonate powder for industry (manufactured by Asahi Glass Company, Limited) having an average particle diameter of 95 μm of primary particles, with 2.0 kg of activated carbon (tradename: Shirasagi C manufactured by Japan EnviroChemicals, Ltd.) having an average particle diameter of 67 μm, 0.2 kg of slaked lime (manufactured by KANTO CHEMICAL CO., INC.) having an average particle diameter of 5 μm, and 2.0 kg of a composite A-type zeolite (manufactured by Nippon Builder Co., Ltd.) having an average particle diameter of 2.0 μm, an average pore radius of 8.24 nm and a pore volume of 0.010 $cm^3/g$, and compression-molding the resultant mixture by a roll press type compression-molding machine (tradename: roller compactor WP type, roll outer diameter: 230 mm, roll length: 80 mm, manufactured by TURBO KOGYO CO., LTD.) at a linear pressure of 36.8 kN/cm.

Further, in 100 mass % of the molded product, sodium hydrogencarbonate was 79 mass %, activated carbon was 10 mass %, and zeolite was 10 mass %.

Then, the flake-like molded product thus obtained was pulverized and granulated by a roll type pulverizing-granulating machine (tradename: pulverizing roll granulator GRN-2521 type manufactured by NIPPON GRANULATOR CO., LTD.) to obtain granules. The pulverizing machine comprised two steps, and the first step at a rotating blade pitch of 14 mm and the second step of 4 mm. Thereafter, the granules thus obtained were subjected to sieving with a stainless standard sieve having an inner diameter of 200 mm and having two sets of sieves having an opening of 1.7 mm and an opening of 4.0 mm, and the present granules remained on the sieve of 1.7 mm were obtained.

Thereafter, 100 g of the granules was placed on a set of stainless steel standard sieves having an inner diameter of 200 mm and having openings of 4.0 mm, 2.80 mm, 2.00 mm, 1.41 mm and 1.00 mm respectively overlaid and a bottom tray was placed on the lowest bottom. The granules were then shaked by a low tap shaker type sieve-shaking machine (tradename: IIDA SHIEVE SHAKER manufactured by IIDA SEISAKUSYO., shaking number: 290 rotations/minute, hitting number: 165 times/minute) for 10 minutes, and the average particle diameter was determined to be a particle diameter having an accumulated passing mass amount of 50% by measuring a remaining mass amount on each sieve and the bottom tray and graphing an accumulated passing mass amount to each opening. The present granule thus measured had an average particle diameter of 1.9 mm. Granules having a particle diameter of at most 4 mm were 100 mass %, and granules having a particle diameter of at most 1.0 mm were 6.3 mass %.

The hardness of the granule was measured in accordance with the above-mentioned hardness-measuring method. Thus, the above obtained granules having an average particle diameter of 1.9 mm were sieved with sieves having openings of respectively 1.4 mm, 2.0 mm and 2.8 mm, and 20 pieces of granules having each particle diameter were measured with regard to the hardness to determine an average value. As this result, the average hardness of granules of 1.4 to 2.0 mm was 37.8 N, the average hardness of granules of 2.0 to 2.8 mm was 45.1 N, and the average hardness of granules of at least 2.8 mm was 56.8 N.

Thereafter, the above obtained granule was packed as a packing material into a glass-made reactor having an internal diameter of 30 mm and a length of 300 mm and having an air permeable glass plate at the bottom to have a packed bed height of 100 mm. The packed volume was 70.7 $cm^3$, the packed mass was 81.9 g, and the packed density was 1.16 $g/cm^3$. A gas comprising 0.3 vol % of $Cl_2$ and 99.7 vol % of $N_2$ was charged from the bottom at a temperature of 25° C. under normal pressure at a flow amount of 424 $cm^3$/minute in a standard state (0° C., 0.10 MPa).

The breakthrough of chlorine gas from the column after the treatment was observed by using the above gas detector for semiconductor manufacturing gases, but there was no detection immediately after the initiation.

After 2,485 minutes from the initiation of the treatment, there was a breakthrough of the removing-object gas, and the alarm of the gas detector was activated. The removed chlorine gas per 1 kg of the present granule was 38.6 L, as calculated in the standard state.

The packing material was taken out and checked, and it was observed that the granule was not powderized; the granule particles of the present invention were not bonded; and a chlorine odor was not substantially generated, whereby an operation of taking out the present granule was easy. Also, when the packing material was dissolved in water, components other than zeolite and the remaining slaked lime were dissolved, and by subjecting it to filtration-separation, the amount of a solid waste could be reduced. Also, the temperature of the packed bed during treating the mixed gas was measured, the maximum temperature of the outer part of the glass wall of the packed bed was 27° C. and the minimum temperature thereof was 25° C. Such a temperature was highest in the lower gas stream side and lowest in the upper gas stream side. Also, the places of the maximum temperature and the minimum temperature moved to the lower gas stream side in accordance with the progress of the reaction. This tendency was common also in the following Examples of the present invention and Comparative Examples. Also, the temperature at the outside of the apparatus was 20 to 25° C. in all of the following Examples of the present invention and Comparative Examples.

Example 2

A flake-like molded product having a slaked lime content of 5 mass % which is a mixture of sodium hydrogencarbonate, activated carbon, slaked lime and zeolite, was obtained in the same manner as in Example 1, except that the blend amounts of raw materials of a granule were changed to 15 kg of sodium hydrogencarbonate, 2.0 kg of activated carbon, 1.0 kg of slaked lime and 2.0 kg of composite A-type zeolite. Further, in 100 mass % of the molded product, sodium hydrogencarbonate was 75 mass %, activated carbon was 10 mass % and zeolite was 10 mass %.

The average particle diameter of the present granule was 2.1 mm. Particles having a particle diameter of at most 4 mm were 100 mass %, and particles having a particle diameter of at most 1.0 mm were 5.4 mass %. Further, when the granule was packed to have a height of a packed bed of 100 mm, the packed volume was 70.7 $cm^3$, the packed amount was 84.3 g and the packed density was 1.19 $g/cm^3$.

The detection of breakthrough by using a gas detector for semiconductor manufacturing gases was carried out in the same manner as in Example 1, but there was no detection immediately after the initiation.

After 1,775 minutes from the initiation of the treatment, there was breakthrough of the removing-object gas, and the alarm of the gas detector was activated. The removed chlorine gas per 1 kg of the present granule was 26.8 L, as calculated in the standard state.

The packing material was taken out and checked, and it was observed that the granule was not powderized; the particles of the present invention were not bonded; and a chlorine odor was not substantially generated, whereby an operation of taking out the present granule was easy. Also, when the packing material was dissolved in water, components other than zeolite and the remaining slaked lime were dissolved, and by subjecting it to filtration-separation, the amount of a solid waste could be reduced. Also, when the temperature of the packed bed during treating the mixed gas was measured, the maximum temperature of the outer part of the glass wall of the packed bed was 27° C. and the minimum temperature thereof was 25° C.

Example 3

A flake-like molded product having a slaked lime content of 10 mass % which is a mixture of sodium hydrogencarbonate, activated carbon, slaked lime and zeolite, was obtained in the same manner as in Example 1, except that the blend amounts of raw materials of a granule were changed to 14 kg of sodium hydrogencarbonate, 2.0 kg of activated carbon, 2.0 kg of slaked lime and 2.0 kg of composite A-type zeolite. Further, in 100 mass % of the molded product, sodium hydrogencarbonate was 70 mass %, activated carbon was 10 mass % and zeolite was 10 mass %.

The average particle diameter of the present granule was 2.3 mm. Particles having a particle diameter of at most 4 mm were 100 mass %, and particles having a particle diameter of at most 1.0 mm were 4.5 mass %. Further, when the granule was packed to have a height of a packed bed of 100 mm, the packed volume was 70.7 cm$^3$, the packed amount was 81.6 g and the packed density was 1.15 g/cm$^3$.

The detection of breakthrough by using a gas detector for semiconductor manufacturing gases was carried out in the same manner as in Example 1, but there was no detection immediately after the initiation.

After 1,210 minutes from the initiation of the treatment, there was breakthrough of the removing-object gas, and the alarm of the gas detector was activated. The removed chlorine gas per 1 kg of the present granule was 18.9 L, as calculated in the standard state.

The packing material was taken out and checked, and it was observed that the granule was not powderized; the particles of the present invention were not bonded; and a chlorine odor was not substantially generated, whereby an operation of taking out the present granule was easy. Also, when the packing was dissolved in water, components other than zeolite and the remaining slaked lime were dissolved, and by subjecting it to filtration-separation, the amount of a solid waste could be reduced. Also, when the temperature of the packed bed during treating the mixed gas was measured, the maximum temperature of the outer part of the glass wall of the packed bed was 28° C. and the minimum temperature thereof was 26° C.

Example 4

A flake-like molded product having a slaked lime content of 0.1 mass % which is a mixture of sodium hydrogencarbonate, activated carbon, slaked lime and zeolite, was obtained in the same manner as in Example 1, except that the blend amounts of raw materials of a granule were changed to 15.98 kg of sodium hydrogencarbonate, 2.0 kg of activated carbon, 0.02 kg of slaked lime and 2.0 kg of composite A-type zeolite. Further, in 100 mass % of the molded product, sodium hydrogencarbonate was 79.9 mass %, activated carbon was 10 mass % and zeolite was 10 mass %.

The average particle diameter of the present granule was 1.8 mm. Particles having a particle diameter of at most 4 mm were 100 mass %, and particles having a particle diameter of at most 1.0 mm were 7.2 mass %. Further, when the granule was packed to have a height of a packed bed of 100 mm, the packed volume was 70.7 cm$^3$, the packed amount was 70.4 g and the packed density was 1.00 g/cm$^3$.

The detection of breakthrough by using a gas detector for semiconductor manufacturing gases was carried out in the same manner as in Example 1, but there was no detection immediately after the initiation.

After 2,113 minutes from the initiation of the treatment, there was breakthrough of the removing-object gas, and the alarm of the gas detector was activated. The removed chlorine gas per 1 kg of the present granule was 38.2 L, as calculated in the standard state.

The packing material was taken out and checked, and it was observed that the granule was not powderized; the particles of the present invention were not bonded; and a chlorine odor was not substantially generated, whereby an operation of taking out the present granule was easy. Also, when the packing material was dissolved in water, components other than zeolite and the remaining slaked lime were dissolved, and by subjecting it to filtration-separation, the amount of a solid waste could be reduced. Also, when a temperature of the packed bed during treating the mixed gas was measured, the maximum temperature of the outer part of the glass wall of the packed bed was 25° C. and the minimum temperature thereof was 23° C.

Comparative Example 1

A flake-like molded product made of a mixture of sodium hydrogencarbonate, activated carbon and zeolite was obtained in the same manner as in Example 1 except that the blend amounts of raw materials of a granule was changed to 16 kg of sodium hydrogencarbonate, 2.0 kg of activated carbon and 2.0 kg of composite A-type zeolite. Unlike Examples 1 to 4, in Comparative Example 1, slaked lime was not incorporated as a sub-component at all. Further, in 100 mass % of the mold product, sodium hydrogencarbonate was 80 mass %, activated carbon was 10 mass % and zeolite was 10 mass %.

The average particle diameter of the present granule was 2.1 mm. Particles having a particle diameter of at most 4 mm were 100 mass %, and particles having a particle diameter of at most 1.0 mm were 5.1 mass %. Further, when the granule was packed to have a height of a packed bed of 100 mm, the packed volume was 70.7 cm$^3$, the packed amount was 81.0 g and the packed density was 1.15 g/cm$^3$.

The detection of breakthrough by using a gas detector for semiconductor manufacturing gases was carried out in the same manner as in Example 1, but there was no detection immediately after the initiation.

After 955 minutes from the initiation of the treatment, there was breakthrough of the removing-object gas, and the alarm of the gas detector was activated.

The removed chlorine gas per 1 kg of the present granule was 15.0 L, as calculated in the standard state.

The packing material was taken out and checked, and it was observed that the granule was not powderized; the particles of the present invention were not bonded; and a chlorine odor was not substantially generated, whereby an operation of taking out the present granule was easy. Also, when the packing material was dissolved in water, components other than zeolite were dissolved, and by subjecting it to filtration-separation, the amount of a solid waste could be reduced. Also, when the temperature of the packed bed during treating the mixed gas was measured, the maximum temperature of the outer part of the glass wall of the packed bed was 29° C. and the minimum 11 temperature thereof was 25° C.

The results of the removed amount of chlorine gas in the above Examples 1 to 4 and Comparative Example 1 are shown in a graph of FIG. 1.

By adding a small amount of slaked lime as a sub-component, it is possible to achieve the performance much better than the removing ability of a conventional remover, and it is more effective with a smaller amount of slaked lime to be added.

Example 5

In a standard state (0° C., 0.10 MPa), a gas having a flow amount of 424 cm$^3$/min and comprising 0.3 vol % of $F_2$ and 99.7 vol % of $N_2$ was set as a gas to be treated, and the removing effect of fluorine ($F_2$) gas was checked by the same method as in the above case where chlorine gas ($Cl_2$) was set as a gas to be treated.

In Example 5, the granule obtained in Example 1 was packed to have a height of packed bed of 100 mm. At that time, the packed volume was 70.7 cm$^3$, the packed amount was 70.0 g and the packed density was 0.99 g/cm$^3$. Then, the above fluorine gas was injected from the bottom under a normal pressure at 25° C.

The breakthrough from the column after treating fluorine gas was observed by using the above gas detector for semiconductor manufacturing gases, but there was no detection immediately after the initiation.

After 7,532 minutes from the initiation of the treatment, there was a breakthrough of the removing-object gas, and the alarm of the gas detector was activated. The removed fluorine gas per 1 kg of the present granule was 137 L, as calculated in the standard state.

The packing material was taken out and checked, and it was observed that the granule was not powderized; the particles of the present invention were not bonded; and an odor was not substantially generated, whereby an operation of taking out the present granule was easy. Also, when the packing material was dissolved in water, components other than zeolite and the remaining slaked lime were dissolved, and by subjecting it to filtration-separation, the amount of a solid waste could be reduced. Also, when the temperature of the packed bed during treating the mixed gas was measured, the maximum temperature of the outer part of the glass wall of the packed bed was 27° C. and the minimum temperature thereof was 25° C.

Comparative Example 2

The granule obtained in Comparative Example 1 was packed to have a height of packed bed of 100 mm. At that time, the packed volume was 70.7 cm$^3$, the packed amount was 67.6 g and the packed density was 0.96 g/cm$^3$. Then, the above fluorine gas was injected from the bottom under a normal pressure at 25° C.

The breakthrough from the column after treating fluorine gas was observed by using the above gas detector for semiconductor manufacturing gases, but there was no detection immediately after the initiation.

After 2,645 minutes from the initiation of the treatment, there was a breakthrough of the removing-object gas, and the alarm of the gas detector was activated. The removed fluorine gas per 1 kg of the present granule was 49.8 L, as calculated in the standard state.

The packing material was taken out and checked, and it was observed that the granule was not powderized; the particles of the present invention were not bonded; and an odor was not substantially generated, whereby an operation of taking out the present granule was easy. Also, when the packing was dissolved in water, components other than zeolite were dissolved, and by subjecting it to filtration-separation, the amount of a solid waste could be reduced. Also, when the temperature of the packed bed during treating the mixed gas was measured, the maximum temperature of the outer part of the glass wall of the packed bed was 27° C. and the minimum temperature thereof was 25° C.

Example 6

In a standard state (0° C., 0.10 MPa), a gas having a flow amount of 424 cm$^3$/min and comprising 0.3 vol % of $BCl_3$ and 99.7 vol % of $N_2$ was set as a gas to be treated, and the removing effect of boron trichloride ($BCl_3$) gas was checked by the same method as in the above case where chlorine gas ($Cl_2$) was set as a gas to be treated.

In Example 6, the granule obtained in Example 1 was packed to have a height of packed bed of 100 mm. At that time, the packed volume was 70.7 cm$^3$, the packed amount was 82.0 g and the packed density was 1.16 g/cm$^3$. Then, the above boron trichloride gas was injected from the bottom with a normal pressure at 25° C.

The breakthrough from the column after treating boron trichloride gas, was observed by using the above gas detector for semiconductor manufacturing gases, but there was no detection immediately after the initiation.

After 375 minutes from the initiation of the treatment, there was a breakthrough of the removing-object gas, and the alarm of the gas detector was activated.

The removed boron trichloride gas per 1 kg of the present granule was 5.8 L, as calculated in the standard state.

The packing material was taken out and checked, and it was observed that the granule was not powderized; the particles of the present invention were not bonded; and an odor was not substantially generated, whereby an operation of taking out the present granule was easy. Also, when the packing material was dissolved in water, components other than zeolite and the remaining slaked lime were dissolved, and by subjecting it to filtration-separation, the amount of a solid waste could be reduced. Also, when the temperature of the packed bed during treating the mixed gas was measured, the maximum temperature of the outer part of the glass wall of the packed bed was 27° C. and the minimum temperature thereof was 25° C.

Comparative Example 3

The granule obtained in Comparative Example 1 was packed to have a height of packed bed of 100 mm. At that time, the packed volume was 70.7 cm$^3$, the packed amount was 81.6 g and the packed density was 1.15 g/cm$^3$. Then, the above boron trichloride gas was injected from the bottom with a normal pressure at 25° C.

The breakthrough from the column after treating boron trichloride gas, was observed by using the above gas detector for semiconductor manufacturing gases, but there was no detection immediately after the initiation.

After 314 minutes from the initiation of the treatment, there was a breakthrough of the removing-object gas, and the alarm of the gas detector was activated.

The removed boron trichloride gas per 1 kg of the present granule was 4.9 L, as calculated in the standard state.

The packing material was taken out and checked, and it was observed that the granule was not powderized; the particles of the present invention were not bonded; and an odor was not substantially generated, whereby an operation of taking out the present granule was easy. Also, when the packing was dissolved in water, components other than zeolite were dissolved, and by subjecting it to filtration-separation, the amount of a solid waste could be reduced. Also, when the temperature of the packed bed during treating the mixed gas was measured, the maximum temperature of the outer part of the glass wall of the packed bed was 27° C. and the minimum temperature thereof was 25° C.

Example 7

The effect of removal by the concentration of the present halogen series gas to be removed was measured by using a concentration-adjusted gas wherein a chlorine gas was diluted by a nitrogen gas.

The granule obtained in Example 1 was packed in a reaction tube in the same manner as in removing experiments in Examples 1 to 6 and Comparative Examples 1 to 3, and the removing ability was measured at the time of treating a gas having a chlorine gas adjusted to a concentration of 0.3 vol %, 1.0 vol % or 3.0 vol %.

The results are shown in Table 1.

TABLE 1

| Concentration of chlorine gas (vol %) | 0.1 | 1.0 | 3.0 |
|---|---|---|---|
| Removing ability (NL/kg) | 38.6 | 42.3 | 47.0 |

Comparative Example 4

The granule obtained in Comparative Example 1 was packed in a reaction tube in the same manner as in removing experiments in Examples 1 to 6 and Comparative Examples 1 to 3, and the removing ability was measured at the time of treating a gas having a chlorine gas adjusted to a concentration of 0.3 vol %, 1.0 vol % or 3.0 vol %.

The results are shown in Table 2.

TABLE 2

| Concentration of chlorine gas (vol %) | 0.1 | 1.0 | 3.0 |
|---|---|---|---|
| Removing ability (NL/kg) | 15.0 | 22.4 | 32.6 |

According to the results of the above Example 7 and Comparative Example 4, it became evident that the present granule could achieve a high removing effect in a case where the concentration of the present halogen series gas is low.

Example 8

A flake-like molded product having a slaked lime content of 3 mass % which is a mixture of sodium hydrogencarbonate, activated carbon, slaked lime and zeolite, was obtained in the same manner as in Example 1, except that the blend amounts of raw materials of a granule were changed to 15.4 kg of sodium hydrogencarbonate, 2.0 kg of activated carbon, 0.6 kg of slaked lime and 2.0 kg of composite A-type zeolite. Further, in 100 mass % of the molded product, sodium hydrogencarbonate was 77 mass %, activated carbon was 10 mass % and zeolite was 10 mass %.

The average particle diameter of the present granule was 1.8 mm. Particles having a particle diameter of at most 4 mm were 100 mass %, and particles having a particle diameter of at most 1.0 mm were 5.5 mass %. Further, when the granule was packed to have a height of a packed bed of 100 mm, the packed volume was 70.7 cm$^3$, the packed amount was 84.3 g and the packed density was 1.20 g/cm$^3$.

Then, the detection of breakthrough by using a gas detector for semiconductor manufacturing gases, was carried out in the same manner as in Example 1, but there was no detection immediately after the initiation.

After 2,005 minutes from the initiation of the treatment, there was breakthrough of the removing-object gas, and the alarm of the gas detector was activated. The removed chlorine gas per 1 kg of the present granule was 30.1 L, as calculated in the standard state.

The packing material was taken out and checked, and it was observed that the granule was not powderized; the particles of the present invention were not bonded; and a chlorine odor was not substantially generated, whereby an operation of taking out the present granule was easy. Also, when the packing material was dissolved in water, components other than zeolite and the remaining slaked lime were dissolved, and by subjecting it to filtration-separation, the amount of a solid waste could be reduced. Also, when the temperature of the packed bed during treating the mixed gas was measured, the maximum temperature of the outer part of the glass wall of the packed bed was 27° C. and the minimum temperature thereof was 25° C.

Example 9

A flake-like molded product having a slaked lime content of 15 mass % which is a mixture of sodium hydrogencarbonate, activated carbon, slaked lime and zeolite, was obtained in the same manner as in Example 1, except that the blend amounts of raw materials of a granule were changed to 13.0 kg of sodium hydrogencarbonate, 2.0 kg of activated carbon, 3.0 kg of slaked lime and 2.0 kg of composite A-type zeolite. Further, in 100 mass % of the molded product, sodium hydrogencarbonate was 65 mass %, activated carbon was 10 mass % and zeolite was 10 mass %.

The average particle diameter of the present granule was 2.1 mm. Particles having a particle diameter of at most 4 mm were 100 mass %, and particles having a particle diameter of at most 1.0 mm were 5.1 mass %. Further, when the granule was packed to have a height of a packed bed of 100 mm, the packed volume was 70.7 cm$^3$, the packed amount was 76.8 g and the packed density was 1.09 g/cm$^3$.

Then, the detection of breakthrough by using a gas detector for semiconductor manufacturing gases, was carried out in the same manner as in Example 1, but there was no detection immediately after the initiation.

After 1,082 minutes from the initiation of the treatment, there was breakthrough of the removing-object gas, and the alarm of the gas detector was activated. The removed chlorine gas per 1 kg of the present granule was 17.9 L, as calculated in the standard state.

The packing material was taken out and checked, and it was observed that the granule was not powdered; the particles of the present invention were not bonded; and a chlorine odor was not substantially generated, whereby an operation of taking out the present granule was easy. Also, when the packing material was dissolved in water, components other than zeolite and the remaining slaked lime were dissolved, and by subjecting it to filtration-separation, the amount of a solid waste could be reduced. Also, when the temperature of the packed bed during treating the mixed gas was measured, the maximum temperature of the outer part of the glass wall of the packed bed was 25° C. and the minimum temperature thereof was 23° C.

Comparative Example 5

A flake-like molded product having a slaked lime content of 20 mass % which is a mixture of sodium hydrogencarbonate, activated carbon, slaked lime and zeolite, was obtained in the same manner as in Example 1, except that the blend amounts of raw materials of a granule were changed to 12.0 kg of sodium hydrogencarbonate, 2.0 kg of activated carbon, 4.0 kg of slaked lime and 2.0 kg of composite A-type zeolite. Further, in 100 mass % of the molded product, sodium hydrogencarbonate was 60 mass %, activated carbon was 10 mass % and zeolite was 10 mass %.

The average particle diameter of the present granule was 2.0 mm. Particles having a particle diameter of at most 4 mm were 100 mass %, and particles having a particle diameter of at most 1.0 mm were 4.8 mass %. Further, when the granule was packed to have a height of a packed bed of 100 mm, the packed volume was 70.7 cm$^3$, the packed amount was 69.2 g and the packed density was 0.98 g/cm$^3$.

Then, the detection of breakthrough by using a gas detector for semiconductor manufacturing gases, was carried out in the same manner as in Example 1, but there was no detection immediately after the initiation.

After 887 minutes from the initiation of the treatment, there was breakthrough of the removing-object gas, and the alarm of the gas detector was activated. The removed chlorine gas per 1 kg of the present granule was 16.3 L, as calculated in the standard state.

The packing was taken out and checked, and it was observed that the granule was not powdered; the particles of the present invention were not bonded; and a chlorine odor was not substantially generated, whereby an operation of taking out the present granule was easy. Also, when the packing was dissolved in water, components other than zeolite and the remaining slaked lime were dissolved, and by subjecting it to filtration-separation, the amount of a solid waste could be reduced. Also, when a temperature of the packed bed during treating the mixed gas was measured, the maximum temperature of the outer part of the glass wall of the packed bed was 27° C. and the minimum temperature thereof was 25° C.

Example 10

A flake-like molded product having a magnesium hydrogencarbonate content of 1 mass % which is a mixture of sodium hydrogencarbonate, activated carbon, magnesium hydroxide and zeolite, was obtained in the same manner as in Example 1, except that the blend amounts of raw materials of a granule were changed to 15.8 kg of sodium hydrogencarbonate, 2.0 kg of activated carbon, 0.2 kg of magnesium hydroxide and 2.0 kg of composite A-type zeolite. Further, in 100 mass % of the molded product, sodium hydrogencarbonate was 79 mass %, activated carbon was 10 mass % and zeolite was 10 mass %.

The average particle diameter of the present granule was 1.9 mm. Particles having a particle diameter of at most 4 mm were 100 mass %, and particles having a particle diameter of at most 1.0 mm were 6.0 mass %. Further, when the granule was packed to have a height of a packed bed of 100 mm, the packed volume was 70.7 cm$^3$, the packed amount was 70.7 g and the packed density was 1.00 g/cm$^3$.

Then, the detection of breakthrough by using a gas detector for semiconductor manufacturing gases was carried out in the same manner as in Example 1, but there was no detection immediately after the initiation.

After 1,755 minutes from the initiation of the treatment, there was breakthrough of the removing-object gas, and the alarm of the gas detector was activated. The removed chlorine gas per 1 kg of the present granule was 31.6 L by a normal state calculation.

The packing material was taken out and checked, and it was observed that the granule was not powderized; the particles of the present invention were not bonded; and a chlorine odor was not substantially generated, whereby an operation of taking out the present granule was easy. Also, when the packing was dissolved in water, components other than zeolite and the remaining magnesium hydrogencarbonate were dissolved, and by subjecting it to filtration-separation, the amount of a solid waste could be reduced. Also, when the temperature of the packed bed during treating the mixed gas was measured, the maximum temperature of the outer part of the glass wall of the packed bed was 29° C. and the minimum temperature thereof was 25° C.

INDUSTRIAL APPLICABILITY

The method for removing a halogen series gas and the agent for removing a halogen series gas of the present invention can remove exhaust gas generated during dry etching or CVD, etc., and halogen series gases of various processes at higher efficiency than before, whereby it is particularly suitable for removing a halogen series gas contained in exhaust gas generated in a step of producing semiconductors, etc. Further, the agent for removing a halogen series gas of the present invention can also be suitably used as an atomizing agent for urgent removal or for an absorbing tube of a gas protection mask.

The entire disclosure of Japanese Patent Application No. 2006-140213 filed on May 19, 2006 including specification, claims, drawings and summary is incorporated herein by reference in its entirety.

What is claimed is:

1. A method for removing a halogen series gas, said method comprising bringing a gas into contact with a granule in the presence of water, wherein said gas comprises $Cl_2$ gas and optionally further comprises compounds which generate hydrogen chloride or hypochlorous acid upon hydrolysis, and wherein said granule comprises, based on the total mass of the granule, from 45 to 99.85 mass % of sodium hydrogencarbonate, from 0.1 to 40 mass % of carbon, from 5 to 15 mass % of zeolite, and from more than 0 mass % to 5 mass % of a hydroxide of calcium.

2. The method for removing a halogen series gas according to claim 1, wherein the granule comprises at least 90 mass % of particles having a particle diameter of at most 4 mm and at most 10 mass % of particles having a particle diameter of at most 1.0 mm.

3. The method for removing a halogen series gas according to claim 1, wherein the granule comprises granule particles of a particle diameter of from 1.4 mm to less than 2.0 mm having an average hardness of at least 5 N, or granule particles of a particle diameter of from 2.0 mm to less than 2.8 mm having an average hardness of at least 15 N, or granule particles of a particle diameter of at least 2.8 mm having an average hardness of at least 25 N.

4. The method for removing a halogen series gas according to claim 1, wherein the granule has a packed density of at least 0.7 g/cm$^3$.

5. The method for removing a halogen series gas according to claim 1, wherein the gas that is brought into contact with the granule in the presence of water is a semiconductor production facility gas.

6. The method for removing a halogen series gas according to claim 1, wherein the halogen series gas consists of $Cl_2$ gas.

* * * * *